UNITED STATES PATENT OFFICE.

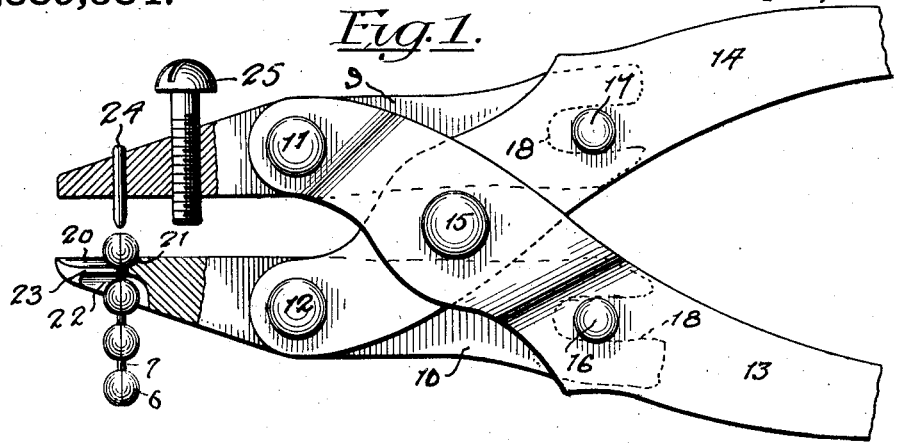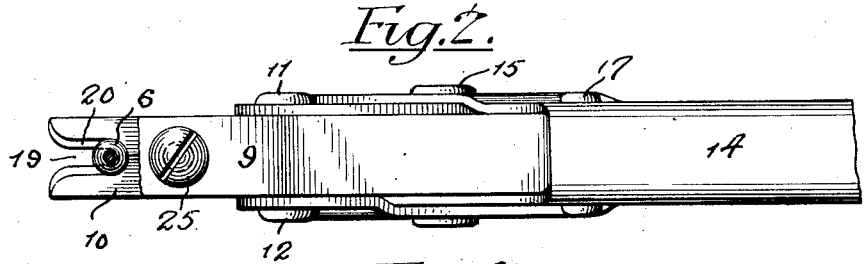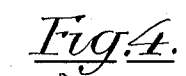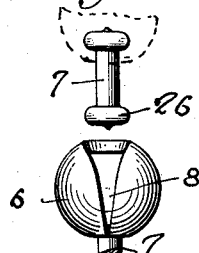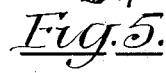

GILBERT W. GOODRIDGE, OF BRIDGEPORT, CONNECTICUT, ASSIGNOR TO THE BEAD CHAIN MANUFACTURING COMPANY, OF BRIDGEPORT, CONNECTICUT, A CORPORATION OF CONNECTICUT.

SPLICING-TOOL.

1,389,584.  Specification of Letters Patent.  Patented Sept. 6, 1921.

Application filed April 12, 1919. Serial No. 289,665.

*To all whom it may concern:*

Be it known that I, GILBERT W. GOODRIDGE, a citizen of the United States of America, residing at Bridgeport, in the county of Fairfield and State of Connecticut, have invented certain new and useful Improvements in Splicing-Tools, of which the following is a specification.

The present invention relates to splicing tools, and particularly to a tool for splicing chains of the ball and link type, the object of my invention being to provide a tool by which the ball element of a chain may be opened to receive the dumb-bell head of a connecting link.

In the accompanying drawings—

Figure 1 is a broken side elevation of a splicing tool in which my invention is embodied in one form;

Fig. 2 is a broken plan thereof;

Fig. 3 is an enlarged transverse section showing the relation of the jaws during the operation of the spreader; and Figs. 4 and 5 are side elevations, respectively, of a dumb-bell link and a spread ball in position to receive the head of the link.

It frequently happens that a length of chain of the present type, which may be supplied with an article to which it is attached, such for instance as an electrical fitting (for which this chain is generally used), is not of a length suitable to a given installation, and the chain, consequently, must be either lengthened or shortened. In order to facilitate this operation I have provided a tool for use in uniting chain ends to effect the desired adjustment of length.

The chain upon which the present tool is designed to operate, comprises alternate balls 6 and dumb-bell links 7. The ball comprises a side seam 8 at which it can be spread to permit the removal or insertion of the head of a dumb-bell link. To accomplish this opening operation the present tool is provided, and it is intended for use with a closing or pinching tool such as that shown in my co-pending application filed herewith.

As here shown the present spreading tool comprises a pair of jaws 9 and 10, pivoted respectively at 11 and 12 to the arms 13 and 14 of a pincers. These arms are pivoted at 15, and are further connected with the jaws 9 and 10 at the guide pins 16 and 17, which work in slots 18 in the jaws to insure the maintenance of the latter in parallel relation in both opened and closed position. The lower jaw 10 is longitudinally slotted at 19, and its inner face grooved at 20 to accommodate a ball 6 of the chain and afford a seat 21 therefor when the adjacent link 7 is passed fully home within the slot 19. The outer face of the jaw is recessed at 22 to accommodate the adjacent ball of the chain, the recess 22 being spaced from the groove 20 by a thin web 23 of less width than the length of the link 7 exposed between adjacent balls.

The other jaw 9 carries a spreading pin 24 which projects beyond the inner face of the jaw and is so located with respect to the slot 19 that it registers with the end opening in the ball 6 when the latter is seated at 21. The jaw 9 also carries an adjustable stop screw 25 which limits the approach of the spreader 24 and prevents the latter from injuring the head of the dumb-bell 7 lying in the slot 19 and engaging the opposite side of the ball 6.

The operation of the tool is readily observed in Figs. 3 to 5, the spreading action being clearly shown in Fig. 3, while the spread ball is shown in Fig. 5. After the head 26 of the link 7 has been inserted through the spread end opening the connection between the adjacent chain lengths is in readiness to be completed by the pinching of the ball in the tool shown in my co-pending application above mentioned.

The parallel ruler movement of the jaws 9 and 10 insures the proper action of the spreader 24 and prevents the distortion of the ball which might be occasioned by the spreader if it approaches the ball on an arc, as would be the case where the jaws are formed merely as continuations of the pivoted lever arms of the pincers. The aperture in the end of the ball is in practice very small in a bead chain of the present type, and it is quite essential that the spreader operate with great accuracy and precision in order to avoid damage to the chain. In some instances, however, a parallel ruler motion may not be necessary for the operating jaws, and I therefore do not limit my invention to the precise structure shown. Nor do I limit the utility of the tool to balls of spherical shape, since the ball element of a chain of this type is frequently made tubular or prismatic rather than spherical, and I use the word "ball" in the following claims in a sense broad enough to include these or any other variant forms.

I claim—

1. A splicing tool for bead chains, comprising a pair of jaws, one of which is slotted in the direction of its length to receive the shank of a dumb-bell chain link and recessed at the inner end of said slot to afford a seat for the chain ball engaging said link, said jaw having its ball supporting face grooved on opposite sides of the slot to accommodate the ball, and being channeled on its opposite face to accommodate an adjacent ball, the two grooves being spaced apart by a thin web of less thickness than the link between the adjacent balls, the entrance to said groove being flared to form a guide for the entering link, in combination with a spreader carried by the other jaw in register with said seat and adapted to operate on the ball seated in said recess in the first mentioned jaw.

2. A splicing tool for bead chains, comprising a pair of jaws, one of which is slotted in the direction of its length to receive the shank of a dumb-bell chain link and recessed at the inner end of said slot to afford a seat for the chain ball engaging said link, said jaw having its ball supporting face grooved on opposite sides of the slot to accommodate the ball, and being channeled on its opposite face to accommodate an adjacent ball, the two grooves being spaced apart by a thin web of less thickness than the link between the adjacent balls, the entrance to said groove being flared to form a guide for the entering link, in combination with a spreader carried by the other jaw in register with said seat and adapted to operate on the ball seated in said recess in the first-mentioned jaw, together with an adjustable spacing screw carried by one of said jaws and adapted to bear upon the other jaw to limit the entry of the spreader into the ball on which it operates, and thus to prevent injury to the head of the link engaged by said ball.

In testimony whereof I have signed my name to this specification.

GILBERT W. GOODRIDGE.